United States Patent
Mildner et al.

(10) Patent No.: US 8,348,290 B2
(45) Date of Patent: Jan. 8, 2013

(54) STRUCTURAL COMPONENT FOR REAR FRAME STRUCTURE OF A MOTOR VEHICLE

(75) Inventors: Udo Mildner, Limburg (DE); Thomas Enderich, Hünstetten (DE)

(73) Assignee: GM Global Technology Operations LLC, Detroit, MI (US)

(*) Notice: Subject to any disclaimer, the term of this patent is extended or adjusted under 35 U.S.C. 154(b) by 115 days.

(21) Appl. No.: 12/883,487

(22) Filed: Sep. 16, 2010

(65) Prior Publication Data

US 2011/0101641 A1 May 5, 2011

(30) Foreign Application Priority Data

Sep. 17, 2009 (DE) .................. 10 2009 042 060

(51) Int. Cl.
*B62D 27/00* (2006.01)
*B60G 9/00* (2006.01)
(52) U.S. Cl. ............................................ 280/124.109
(58) Field of Classification Search ........... 280/124.109, 280/124.125, 124.128
See application file for complete search history.

(56) References Cited

U.S. PATENT DOCUMENTS

| | | | |
|---|---|---|---|
| 4,415,179 A | 11/1983 | Marinelli | |
| 4,593,930 A * | 6/1986 | Davis | 280/124.109 |
| 4,614,247 A * | 9/1986 | Sullivan | 180/24.02 |
| 4,830,396 A * | 5/1989 | Gandiglio | 280/124.109 |
| 6,340,165 B1 | 1/2002 | Kelderman | |
| 7,758,056 B2 * | 7/2010 | VanDenberg et al. | 280/124.128 |
| 2001/0020775 A1 | 9/2001 | Pierce et al. | |
| 2005/0057014 A1 | 3/2005 | Ramsey | |
| 2006/0273540 A1 * | 12/2006 | Heron et al. | 280/124.116 |
| 2009/0278328 A1 * | 11/2009 | VanDenberg et al. | ... 280/124.13 |
| 2009/0278329 A1 * | 11/2009 | VanDenberg et al. | ... 280/124.13 |
| 2010/0230923 A1 * | 9/2010 | VanDenberg et al. | . 280/124.128 |
| 2010/0264613 A1 * | 10/2010 | VanDenberg et al. | . 280/124.116 |
| 2010/0270766 A1 * | 10/2010 | VanDenberg et al. | . 280/124.116 |

(Continued)

FOREIGN PATENT DOCUMENTS

DE 3721815 A1 1/1988

(Continued)

OTHER PUBLICATIONS

Machine translation of DE 3721815 [online]. Espacenet Patent Search [Retrieved on Mar. 26, 2012]. Retrieved from Internet: <URL:http://translationportal.epo.org/emtp/translate/?ACTION=description-retrieval&COUNTRY=DE&FORMAT=docdb&KIND=A1&LOCALE=en_EP&NUMBER=3721815&OPS=ops.epo.org&ENGINE=google&SRCLANG=de&TRGLANG=en>.*

(Continued)

*Primary Examiner* — Paul N Dickson
*Assistant Examiner* — Barry Gooden, Jr.
(74) *Attorney, Agent, or Firm* — Ingrassia Fisher & Lorenz, P.C.

(57) ABSTRACT

A structural component for a rear frame structure of a motor vehicle is provided with a mounting zone suitably designed for the mounting of a rear axle, more preferably of the twist-beam axle type, a first support zone suitably designed for supporting a suspension spring of the rear axle, a second support zone suitably designed for supporting a shock absorber of the rear axle, and at least one fastening zone suitably designed for fastening the structural component to the rear frame structure. In addition, it extends to an assembly consisting of a rear axle with structural components fastened thereto, a rear frame structure of a motor vehicle with such structural components, and a motor vehicle equipped accordingly.

2 Claims, 4 Drawing Sheets

U.S. PATENT DOCUMENTS

2010/0270769 A1\* 10/2010 VanDenberg et al. . 280/124.157

FOREIGN PATENT DOCUMENTS

| EP | 0681932 | A2 | 11/1995 |
| EP | 0774369 | A1 | 5/1997 |
| GB | 2041845 | A | 9/1980 |
| GB | 2351050 | A | 12/2000 |

OTHER PUBLICATIONS

British Patent Office, British Search Report for British Application No. 1015279.1, Jan. 6, 2011.

German Patent Office, German Search Report for German Application No. 102009042060.6, Jul. 7, 2010.

\* cited by examiner

STRUCTURAL COMPONENT FOR REAR FRAME STRUCTURE OF A MOTOR VEHICLE

CROSS-REFERENCE TO RELATED APPLICATION

This application claims priority to German Patent Application No. 102009042060.6, filed Sep. 17, 2009, which is incorporated herein by reference in its entirety.

TECHNICAL FIELD

The present invention is in the field of vehicle technology and relates to a structural component for the rear frame structure of a motor vehicle with self-supporting body work. Additionally it extends to an assembly consisting of a rear axle with structural components fastened thereto, a rear frame structure of a motor vehicle with such an assembly or structural components and a motor vehicle equipped accordingly.

BACKGROUND

As a rule, modern motor vehicles are provided with a self-supporting body which compared with a body mounted on a frame allows weight and cost reduction. In the self-supporting body the components in their totality absorb the forces transmitted into said body, while the stiffness of the body is achieved through hollow sheet metal cross sections ("shell components") and the compact outer sheet metal skin.

In a design known to the persons skilled in the art for example from industrial series production, self-supporting bodies have an underbody terminating the passenger cell towards the bottom, which is connected to the vehicle roof via a plurality of upright struts ("A, B, C and D-pillars"). The underbody consists of several structural components which as sheet-metal parts are welded together during the vehicle production. For forming a rear-frame structure, the underbody comprises two rear frame profiles substantially extending in vehicle longitudinal direction, which at their front end are connected to the floor assembly via a structural component generally designated "rear axle connection".

For example, with twist-beam rear axles, which comprise two wheel-carrying trailing arms interconnected through a transverse profile in a torsionally elastic manner, the trailing arms are each screwed to the rear frame profiles via bearing bushings at their front end. The patent literature thoroughly describes twist-beam rear axles for example in the European Patent Publications EP 0774369 B1 and EP 0681932 B1 of the applicant.

In view of the foregoing, it is at least object of the present invention is to further develop a conventional rear frame structure of a motor vehicle with self-supporting body in an advantageous manner. In addition, other objects, desirable features, and characteristics will become apparent from the subsequent summary and detailed description, and the appended claims, taken in conjunction with the accompanying drawings and this background.

SUMMARY

According to an embodiment of the invention, a structural component for the rear frame structure of a motor vehicle with self-supporting body is provided, an assembly, consisting of a rear axle with structural components fastened thereto, a rear frame structure of a motor vehicle with such an assembly or structural components, and a suitably equipped motor vehicle.

According to an embodiment of the invention, a structural component for a rear frame structure of a motor vehicle is shown. The structural component comprises a series of structurally and/or functionally different zones. Thus the structural component comprises: a mounting zone suitably designed for mounting a rear axle, which more preferably can be a rear axle of the twist-beam axle; a first support zone suitably designed for supporting a suspension spring of the rear axle; a second support zone suitably designed for supporting a shock absorber of the rear axle; and one or a plurality of fastening zones suitably designed for fastening the structural component to the rear frame structure.

A structural component of such design particularly allows the fastening of differently designed rear axles to a same rear frame structure, as a result of which costs in the industrial series production can be saved since adaptation of the rear frame structure to different rear axles is not required. In addition, forces transmitted via the suspension spring and/or shock absorbers are absorbed by the structural component and can be evenly transmitted into the rear frame structure via its connecting points, so that additional reinforcements for example in the area of the contact surfaces of the suspension spring and the shock absorber can be omitted or at least the sheet thicknesses of the sheet metal parts reduced. Because of this, vehicle weight and manufacturing costs can be saved in an advantageous manner.

With another embodiment of the structural component, a first fastening zone and a second fastening zone are provided, which in extension direction of the structural component are arranged spaced from each other. Here it can be particularly advantageous if the mounting zone is molded on to the first fastening zone as a result of which stable mounting of the rear axle and efficient force transmission into the rear frame structure through the first fastening zone is made possible. In addition it can be advantageous if the first fastening zone is connected to the first support zone through a connecting zone, wherein the first support zone is arranged adjacent to the second fastening zone, which likewise makes possible efficient force transmission into the rear frame structure. With respect to efficient force transmission into the rear frame structure through the second fastening zone it can be additionally advantageous if the second support zone is molded on to the second fastening zone.

With another embodiment of the structural component, the connecting zone comprises two web sections arranged in opposite positions and merging with the first fastening section, which web sections form the mounting zone. The mounting zone can more preferably be suitably designed for mounting a bearing bushing of the rear axle. Through this measure, reliable and secure mounting of the rear axle can be realized in a technically simple manner.

With a further embodiment of the structural component, the first support zone is designed plate-shaped, as a result of which a support or contact surface suitable for the suspension spring is provided. In an advantageous manner the first support zone is provided with a plurality of stiffening ribs extending lattice-like.

With a further embodiment of the structural component, the second support zone is provided with a dome for mounting an upper support point of the shock absorber, as a result of which a support or contact surface suitable for the shock absorber is provided, wherein the upper support point of the shock absorber is securely received in the dome.

The structural component is preferentially produced of a light metal material, for example aluminum or an aluminum alloy. Preferentially it is produced unitarily according to the casting method, for example die casting method.

The embodiments of the invention furthermore extend to an assembly consisting of the rear axle, which can more preferably be a rear axle of the twist beam type, to which two structural components are fastened. The assembly can be pre-assembled in the industrial series production as a result of which time and costs can be saved.

Furthermore, the embodiments of the invention extends to a rear frame structure of a motor vehicle with two rear frame profiles at least approximately extending in vehicle longitudinal direction, each of which is fastened to the body by way of a structural component generally described as "rear axle connection", wherein the rear frame structure is provided with an assembly or structural components as described above. Here it can be advantageous from a production and functional point of view if the structural components are each fastened with their first fastening zone to the rear axle connection and their second fastening zone to one of the two rear frame profiles.

In addition, the invention extends to a motor vehicle with a self-supporting body which is equipped with such a rear frame structure.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

It is pointed out that the position and directional details such as "top", "bottom", "laterally", "longitudinally", "transversely", "left", "right", "outside", "inside", "center," etc., refer to the orientation of the structural components or the orientation of the components comprising the structural components in the figures, which illustrate a possible installation position in the motor vehicle. These merely serve the purpose of simpler description of the invention without there being any intention to restrict the invention to these.

In the figures, directions related to the motor vehicle are designated x, y, z in the usual form, wherein the x-direction designates the vehicle longitudinal direction, the y-direction the vehicle transverse direction and the z-direction the vehicle upright direction. The forward driving direction corresponds to the negative x-direction (−x).

Figure 1:
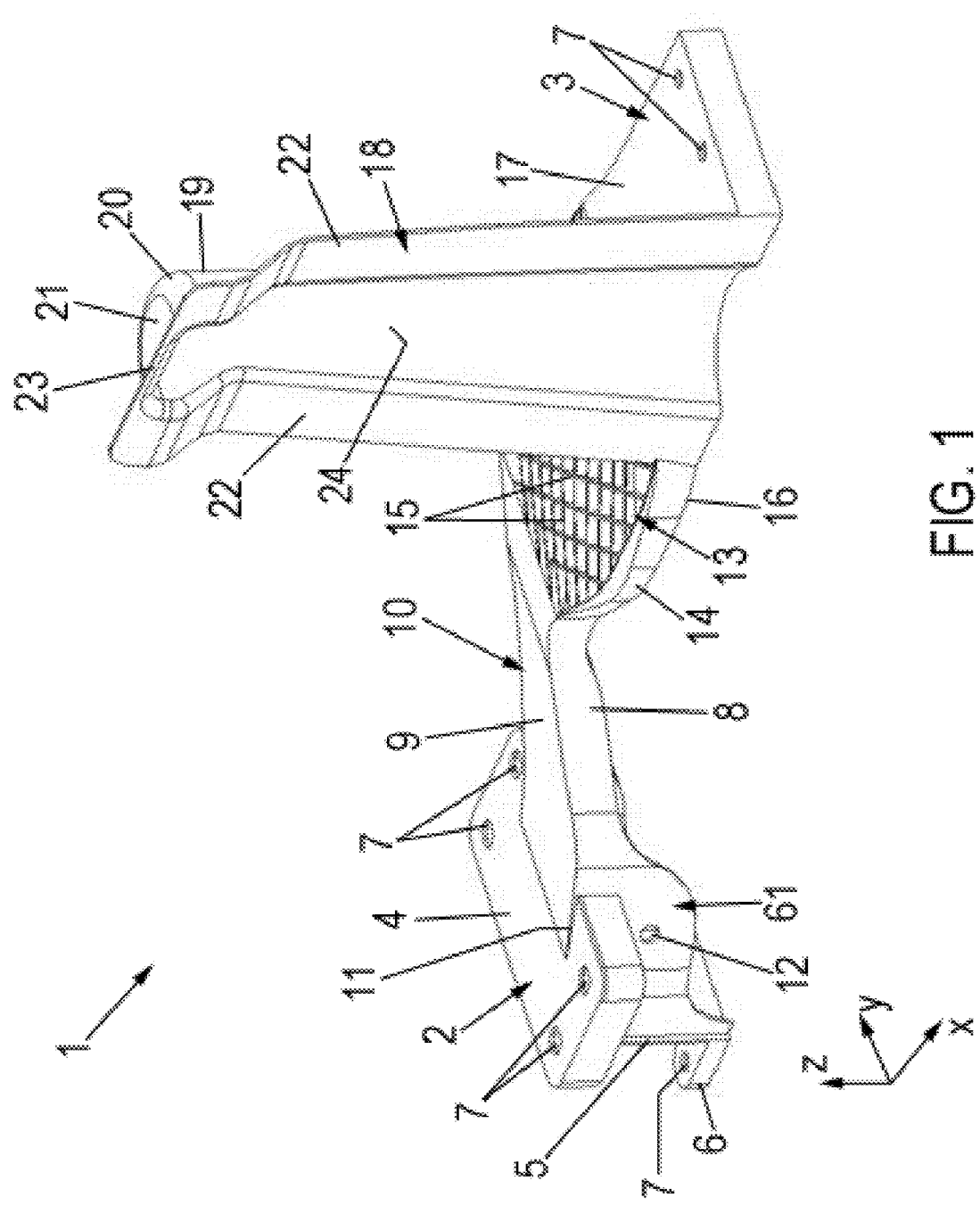
FIG. 1 a perspective view of an exemplary embodiment of the structural component according to the invention.

FIG. 1 shows an exemplary embodiment of the structural component 1 according to an embodiment of the invention in a perspective view. The directional indications made here relate to a possible installation position of the structural component 1 in the motor vehicle.

The structural component 1 is unitarily produced through a conventional casting method, for example as die casting. It can be produced of a ferrous metal, more preferably steel. Preferentially it can consist of a light-metal material, more preferably aluminum or an aluminum alloy. However, it would also be conceivable to produce the structural component 1 from a material other than metal.

On the structural component 1, zones and sections that are functionally and/or structurally different can be seen. Thus the structural component 1 comprises two fastening zones spaced from each other in vehicle longitudinal direction (x), a first fastening zone 2 and a second fastening zone 3, which serve for screw fastening of the structural component 1 to a rear frame structure 44 shown in FIG. 3.

The first fastening zone 2 comprises a first fastening section 4 designed in the shape of a rectangular plate with rounded corners which at its corners is provided with fastening holes 7 oriented in vehicle upright direction (z). Although in FIG. 1 four fastening holes 7 are exemplarily shown, a larger or smaller number of fastening holes 7 can be equally provided. The rectangular first fastening section 4 is at least approximately oriented parallel to the x-y plane, wherein the long sides are directed roughly parallel to the vehicle transverse direction (y). However it would also be conceivable that the long sides are set at an angle to the vehicle transverse direction (y) other than zero, wherein the vehicle inside corners of the first fastening sections 4 are offset towards the vehicle front relative to the vehicle outside corners.

On the bottom of the first fastening section 4 a rectangular first connecting section 5 oriented perpendicularly thereto is molded on, which is arranged approximately in the middle of the short sides of the first fastening section 4 and extends along the long sides of the first fastening section 4. On a front surface of the first connecting section 5, two wafer-like second fastening sections 6 stand away perpendicularly, which are designed in fitted shape to the corner contours of the first fastening section 4 arranged above. The two second fastening sections 5 are each provided with a fastening hole 7 oriented in vehicle upright direction (z), which is arranged aligned with the fastening hole of the first fastening section 4 located above.

On the rear surface of the first connecting section 5, two web sections 8 oriented in opposite positions in vehicle upright direction (z) are molded on, which extend inclined towards the vehicle middle obliquely to the vehicle longitudinal direction (x). The two web sections 8 jointly with a second connecting section 9 perpendicular thereto form a connecting zone 10. In a zone that compared with the remaining web parts is widened in vehicle upright direction (z), these are provided with mounting openings 12 oriented in vehicle transverse direction (y), which are arranged aligned with each other. The two mounting openings 12 are arranged below the first fastening section 4 and are arranged adjacent to the first fastening zone 2. These form a mounting zone 61 for mounting a bearing bush 28 of a rear axle 25 shown in FIG. 2.

The connecting zone 10 merges into a plate-shaped first support zone 13, which is adjoined by the second fastening zone 3 designed in form of a rectangular plate. The first support zone 13 and the second support zone 18 are arranged at least approximately in a same plane parallel to the x-y plane. In accordance with the extension direction of the two web sections 8, the connecting zone 10 with respect to the plane defined by the rectangular first fastening section 4 follows a course directed obliquely upwards and to the inside, i.e. it is set in vehicle upright direction (z) and in vehicle longitudinal direction (x). In particular, the first support zone 13 and the second fastening zone 3 on the one hand and the first fastening zone 2 on the other hand are thus located at two different heights, while the support zone 13 and the second fastening zone 3 are located higher than the first fastening zone 2. For an oblique setting of the connecting zone 10 a clearance 11 can be detected at least in the mind on the rectangular first fastening section 4. Because of this, the second fastening zone 3 is offset upwards and to the inside relative to the first fastening zone 2.

The first support zone 13 following the connecting zone 10 is provided with ribs 15 extending lattice-like between two arc-shaped rims 14, which serve as reinforcement or stiffening ribs for stiffening the first support zone 13.

The second fastening zone 3 comprises a third fastening section 17 designed in the shape of a rectangular plate, which is provided with two fastening openings 7 oriented in vehicle upright direction (z), which serve for the fastening of the second fastening zone 3 to the rear frame structure 44. Although two fastening holes 7 are exemplarily shown in FIG. 1, a greater or smaller number of fastening holes 7 can be equally provided. With its long sides the rectangular third fastening section 17 substantially extends in vehicle longitudinal direction (x).

On the edge of the third fastening section 17 on the vehicle outside a second support zone 18 substantially extending in vehicle upright direction (z) is molded on. This comprises a mounting section 19 oriented in vehicle upright direction (z), which is designed as hollow cylinder part with diameter tapering upwards. The free end of the mounting section 19 is shaped as a dome 20 with a dome area 21 that is parallel to the plane of the third fastening section 17. Molded on to the mounting section 19 is a longitudinal board 22 each standing away laterally, while the two longitudinal boards 22 are interconnected by way of a web 23 limiting the dome 20 on one side. Corresponding to a shape of the second support zone 18 widening in the upper section in vehicle transverse direction (y), the two longitudinal boards 22 in their upper sections are curved to the outside in vehicle transverse direction (y). The second support zone 18 forms a flute 24.

Figure 2:
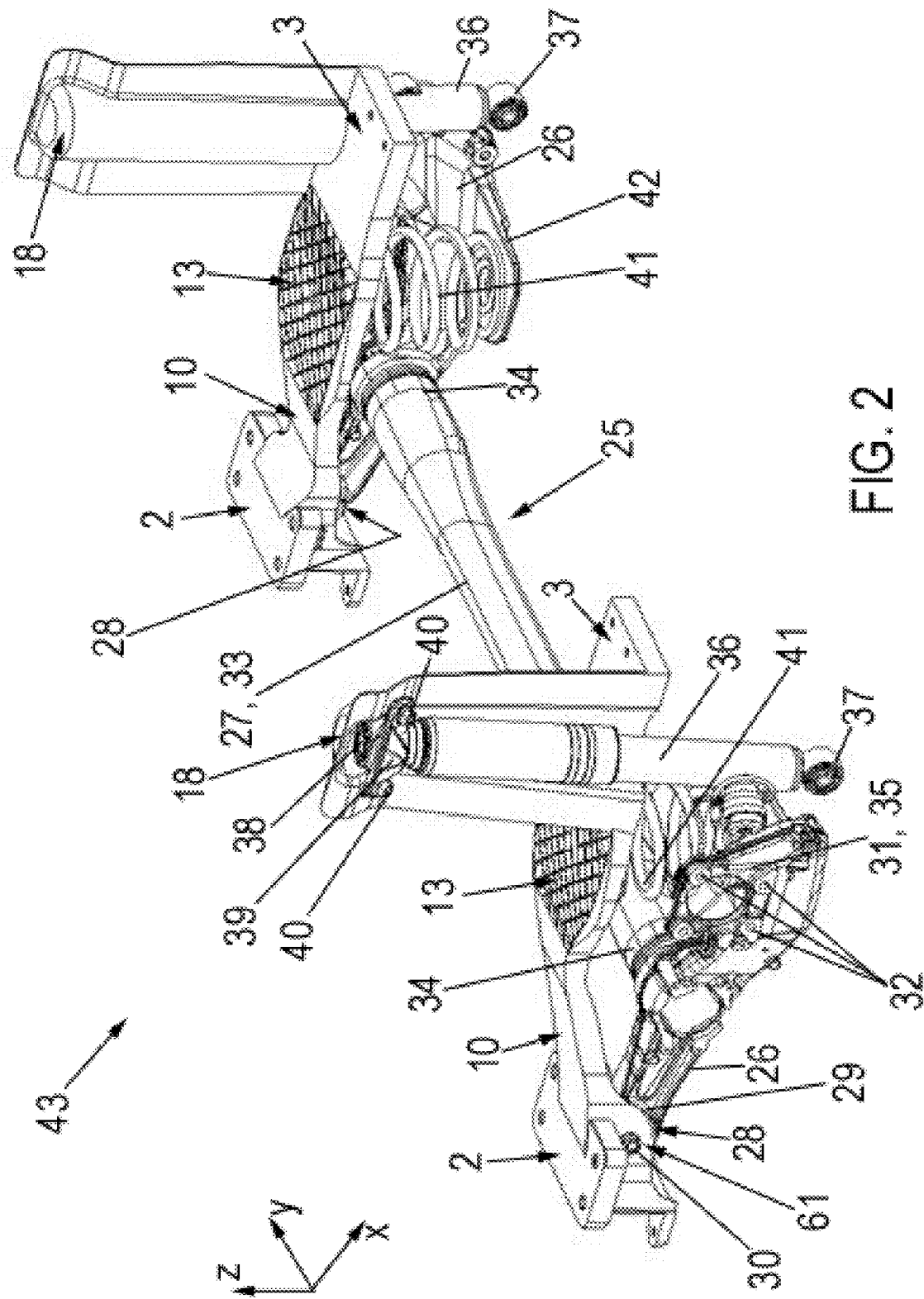
FIG. 2 a perspective view of an assembly consisting of two structural components from FIG. 1 with rear axle of twist-beam axle type fastened thereto.

FIG. 2 shows the structural component 1 from FIG. 1 in conjunction with a rear axle 25 of the twist-beam axle type, wherein the rear axle 25 is fastened to two structural components 1. The rear axle 25 comprises two rigid trailing arms 26 which are interconnected by a flexurally rigid but at least in sections torsionally elastic transverse profile 27 ("torsion profile"). The two trailing arms 26 substantially extend in vehicle longitudinal direction (x), while the transverse profile 27 extends in vehicle transverse direction (y). The transverse profile 27 acts as stabilizer during the mirror-inverted bump and rebound of the two wheels carried by the rear axle 25.

The trailing arms 26 are each connected at their front end with the two web sections 8 of the structural component 1 via an elastic bearing bushing 28 (damping bushing). The bearing bushings 28 obscured in FIG. 2 are each inserted in a bearing eye oriented in vehicle upright direction (z) formed by the front end of the trailing arm 26, of which bearing eye in FIG. 2 merely an edge 29 is noticeable. By way of screw bolts 30, which extend through the bearing holes 12, the bearing bushings 28 are screwed to the web sections 8. Corresponding to the orientation of the two web sections 8 the bearing bushings 28 with their axis direction are for example directed in vehicle transverse direction (y), so that the trailing arms 26 can be elastically swiveled about a swivel axis oriented transversely to the vehicle longitudinal direction (x). However, it is likewise also possible that the bearing bushings 28 with their axis direction are directed obliquely to the vehicle transverse direction (y), while being offset towards the front on the vehicle inside in order to counteract oversteer movement during cornering ("lateral force oversteer") which occurs with this type of axle because of the design. Through the mounting zone 61 the forces transmitted via the trailing arm 26 can be reliably and safely absorbed and via the first fastening zone 2 transmitted into the rear frame structure 44 shown in FIG. 3.

Each of the trailing arms 26 at the rear comprises a fastening section 35 on intended for the assembly of a wheel carrier (not shown) for the rotatable mounting of a vehicle wheel. To this end, each trailing arm 26 is provided with a mounting flange 31, on which the wheel carrier can be mounted through four fastening screws 32.

The transverse profile 27 interconnecting the two trailing arms 26 comprises a twistable intermediate section 33 for example profiled U-shaped in cross section which interconnects the tubular end sections 34. As is known per se to the person skilled in the art, influence can be exerted on the roll center of the rear axle 25 depending on the position of the opening of the U-profile in order to achieve a desired rolling or leaning behavior of the motor vehicle. The U-shaped profiling of the transverse profile 27 must merely be understood as an example. Optionally, the intermediate section 33 of the transverse profile 27 can also be provided with another profile, for example a V or X-shaped profile. In addition, the transverse profile 27 can be provided with an offset in order to have more space available for the driveshaft in the installed state. The transverse profile 27 is connected to the two trailing arms 26 on each of its two end sections 34 in a zone between the bearing bushing 28 and the fastening section 35. A pipe socket which is not described in more detail is molded on to the two trailing arms 26 for this purpose, to which the transverse profile 27 is welded. For welding the transverse profile 27 to the two trailing arms 26 the magnet-arc welding method known per se to the person skilled in the art can be employed for example, wherein the trailing arms 26 are pressed on to the transverse profile 27 during the welding process.

The rear axle 25 comprises two shock absorbers 36 which with their lower support point (foot point) 37 are each seated on the associated trailing arm 26, which is not shown in more detail in FIG. 2. With their upper support point 38 they each dip into the dome 20 of the second support zone 18 of the structural component 1. The upper support points 38 are each secured in their position by means of a fastening strap 39, which is fastened to the longitudinal board 22 of the second support zone 18 of the structural component 1 by means of fastening screws 40. In each structural component 1 the forces transmitted into the shock absorber 36 by the trailing arm 26 are absorbed by the second support zone 18. These forces can be reliably and securely transmitted into the rear frame structure 44 via the second fastening zone 3.

In addition, the rear axle 25 comprises a suspension spring 41 each assigned to a trailing arm 26, which with its lower end is seated on the fastening section 35 of the spring plate 42 molded on to the trailing arm and with its upper end supports itself on a lower side 16 of the plate-shaped first support zone 13. In each structural component 1, the forces transmitted into the suspension spring 41 by the trailing arm 26 are absorbed by the first support zone 13. These forces can be reliably and securely transmitted into the rear frame structure 44 via the second fastening zone 3.

Here, the trailing arms 26 are for example produced of a ferrous metal material by means of a sand casting, gravity-die casting or die-casting method. More preferably, they can be produced of grey cast iron (cast iron with graphite constituents). Preferentially they are produced of a light metal material such as aluminum or an aluminum alloy. Here, the transverse profile 27 is produced for example of a ferrous metal material, more preferably steel.

Figure 3:
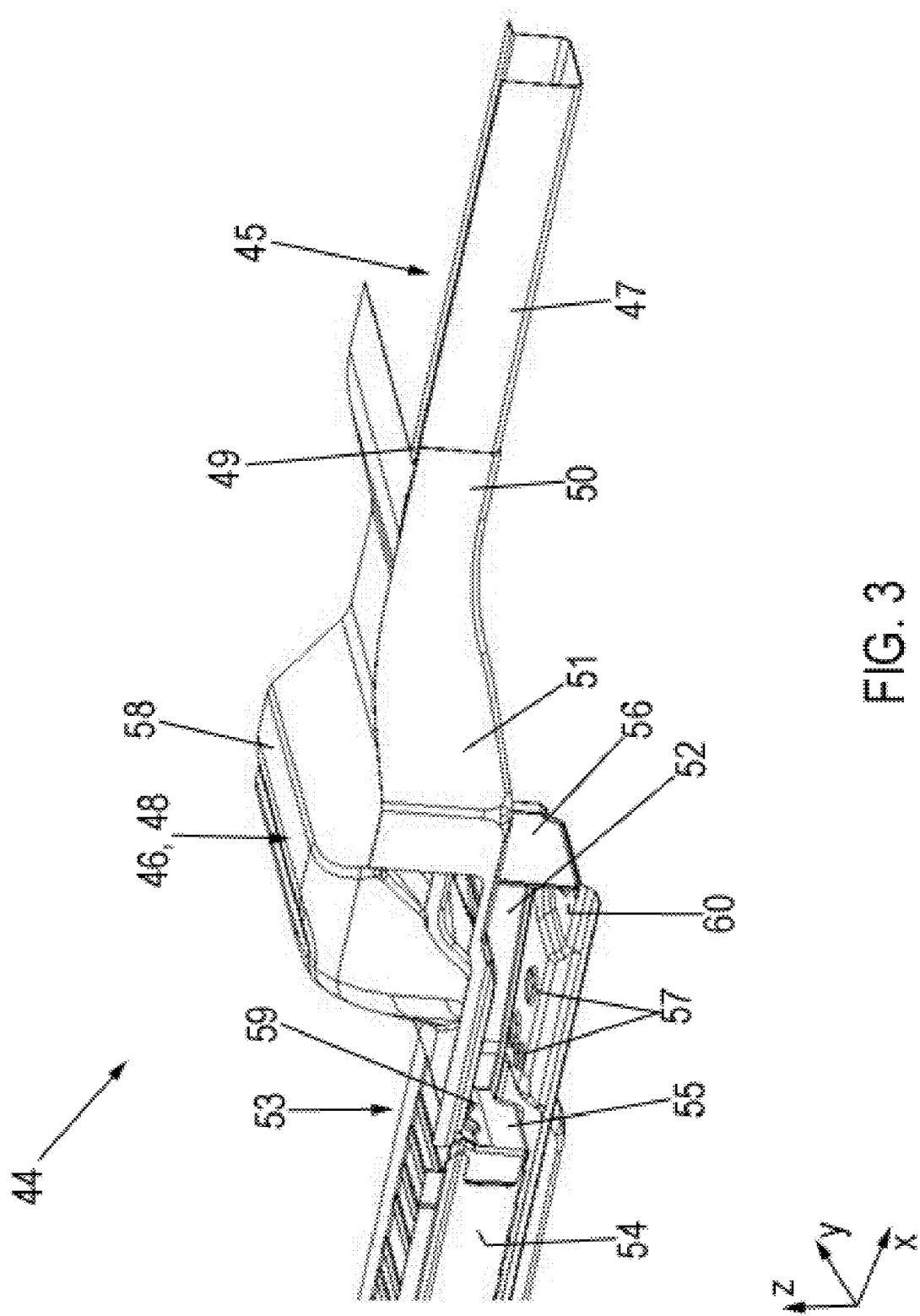
FIG. 3 a perspective view of a rear frame structure.

Through the two structural components 1 and the rear axle 25 of the twist-beam axle type connected to these via the bearing bushings 28 an assembly 43 that can be preassembled is formed, which as such can be fastened to the rear frame structure 44 of a motor vehicle shown in FIG. 3.

FIG. 3 shows the rear frame structure altogether described with the reference number 44 only for the left vehicle side (partially), while the right vehicle side is constructed in corresponding manner (symmetrical). Accordingly, the rear frame structure 44 comprises a rear structural section 45 consisting of two rear frame profiles 47 extending in vehicle longitudinal direction (x), and a front structural section 46, which is designed as rear axle connection 48. The various structural components of the unitary rear frame structure 44 are for example produced according to the deep-drawing method and interconnected by means of welded joints. As an alternative to the welding, riveting can also be provided for example.

In particular, the two rear frame profiles 47 are each inserted in a connecting zone 50 of the rear axle connection 48 by means of a connecting zone 49 and joined to the rear axle connection through spot welds, which is not shown in more detail in FIG. 3. The connecting zone 50 of the rear axle connection 48 comprises an outer rear frame extension 51 and an inner rear frame extension 52.

The rear axle connection 48 is welded to the floor assembly altogether designated with the reference number 53, while a front part of the rear floor panel 58 is welded to the heel plate 55 extending in vehicle transverse direction (y) by way of a reinforcement part 59. A lateral floor panel 54 serves as connection for the sill (not shown) extending in vehicle longitudinal direction (x).

Through a lateral floor filler piece 60 welded to the lateral floor panel 54, an insert corner 56 welded thereto, the inner rear frame extension 52, a box-shaped profile is created below the connection of the rear axle connection 48 to the heel plate 55, as a result of which the stability of the arrangement is increased. The lateral floor panel 54 is provided with a plurality of mounting holes 57 which serve for mounting during the production pass. These can be equally provided in the rear frame profiles 47.

Figure 4:
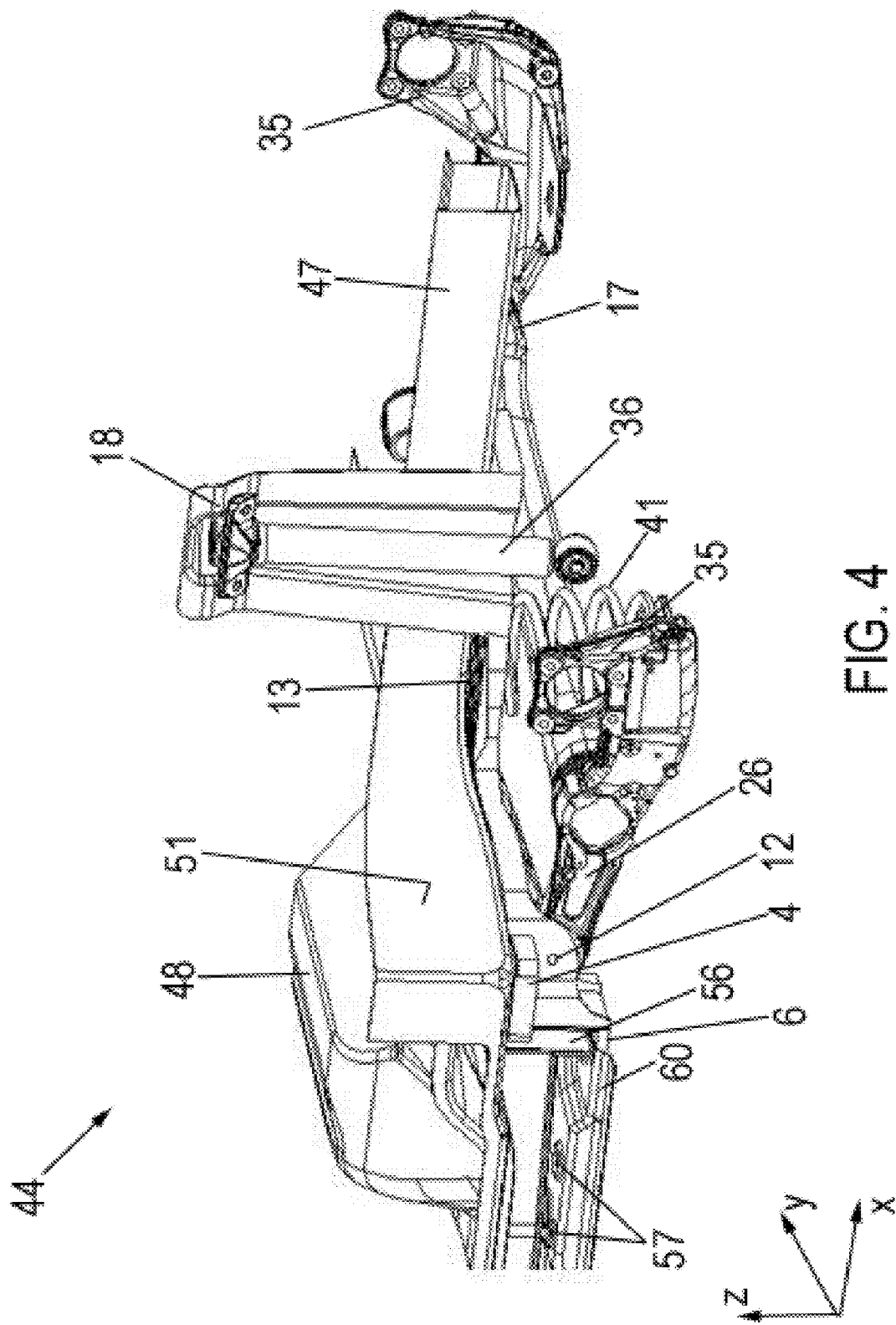
FIG. 4 a perspective view of the rear frame structure from FIG. 3 with assembly from FIG. 2 fastened thereto.

In FIG. 4 the preassembled assembly 43 shown in FIG. 2 is mounted to the rear frame structure 44 shown in FIG. 3, wherein the assembly 43 via the first fastening zones 2 and the second fastening zones 3 of the two structural components 1 is fastened to the rear frame structure 44. Here, the first fastening sections 4 are each screwed to the outer rear frame extension 51 and the second fastening sections 6 each to the lateral floor filler piece 60 by means of screw bolts (not shown), which pass through the fastening holes 7. In addition, the third fastening sections 17 are each screwed to the rear frame profile 47 by means of screw bolts (not shown), which pass through the fastening holes 7. However, it would also be equally conceivable that another type of fastening of the assembly 43 to the rear frame structure 44 via the two structural components 1 is provided.

The embodiments of the invention make available a structural component that can be connected in a simple manner with a rear axle of the twist-beam type to form a preassembled assembly. The bearing bushings of the trailing arms can be screwed to the structural components in a simple manner in order to fasten the rear axle to the two structural components. On the other hand, the assembly can be fastened to the rear frame structure in a simple manner via the fastening zones of the structural components. The structural components thus make possible the fastening of differently designed rear axles to a same rear frame structure, as a result of which costs in industrial series production can be saved since adaptation of the rear frame structures to different rear axles is not required. Thus rear axles of different country or region-specific design can be fastened to a same body structure. Thus, through the structural components it is more preferably possible with a vehicle body of identical design to adapt different axle concepts or axle positions in the vehicle. It is merely required to adapt the structural components to the respective axle concepts, while the screw points can remain the same for all axle concepts. As a result, cost-intensive assembly of various vehicle understructures and the manufacture and assembly of the different sheet metal parts fall away. On the other hand, through the structural components, same rear axles can be fastened to differently designed rear frame structures.

A further advantage is obtained from the fact that the two structural components and the rear axle can be preassembled into an independent assembly. In industrial series production, time and costs can thus be saved. In particular, the usually time and cost-intensive manual screwing-on of the bearing bushings of the trailing arms and of the upper support points of the shock absorbers to the vehicle body fall away. Instead of this, these screw connections can be performed on the structural components in ergonomically favorable positions. Screwing-on of the structural components in the preassembled assembly can be performed during the marriage in an automatic screwing station in the previously defined easily accessible upright screwing positions.

Yet another advantage must be seen in that in the structural component both a contact surface for the suspension spring as well as a mounting for the upper support point of the shock absorber is provided. Thus, all forces transmitted via the suspension spring and/or shock absorber can be absorbed by the structural component and via the screw-on points of the latter, evenly transmitted into the rear frame structure. While driving, the loads on the body parts arranged above the rear frame structure are therefore clearly reduced, so that additional reinforcements for example in the zone of the contact areas of the suspension spring and the shock absorber can be omitted or at least the sheet metal thicknesses of the sheet metal parts reduced, as a result of which savings in vehicle weight and manufacturing costs can be advantageously made. This applies more so since the structural components can be produced by using a light metal material.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a body;
   a rear sub-frame structure of the body, the rear sub-frame structure comprising:
   a mounting zone adapted to mount a rear axle;
   a first support zone formed adjacent to the mounting zone and having a lower surface that supports a suspension spring of the rear axle;

a second support zone having two longitudinal boards extending upwardly and connected to a web for receiving a shock absorber of the rear axle, the first support zone formed between the mounting zone and the second support zone;

a first fastening zone formed adjacent to the first support zone and adapted to fasten a structural component to the rear sub-frame structure; and a second fastening zone formed adjacent to the second support zone adapted to fasten a structural component to the rear sub-frame structure.

2. A motor vehicle, comprising:

a body;

a rear sub-frame structure of the body, the rear sub-frame structure comprising:

a mounting zone adapted to mount a rear axle;

a first support zone formed adjacent to the mounting zone and having a lower surface that supports a suspension spring of the rear axle;

a second support zone having two longitudinal boards extending upwardly and connected to a web for receiving a shock absorber of the rear axle, the first support zone formed between the mounting zone and the second support zone;

a first fastening zone formed adjacent to the first support zone and adapted to fasten a structural component to the rear sub-frame structure; and a second fastening zone formed adjacent to the second support zone adapted to fasten a structural component to the rear sub-frame structure, wherein the first fastening zone has a plurality of first fastener holes spaced apart from at least one second fastener hole vertically in a vehicle upright direction.

* * * * *